United States Patent
Forsthoevel

(10) Patent No.: US 9,403,311 B2
(45) Date of Patent: Aug. 2, 2016

(54) SYSTEM AND METHOD FOR PRODUCING PLASTICS MATERIAL CONTAINERS

(75) Inventor: Jochen Forsthoevel, Neutraubling (DE)

(73) Assignee: KRONES, AG, Neutraubling (DE)

( * ) Notice: Subject to any disclaimer, the term of this patent is extended or adjusted under 35 U.S.C. 154(b) by 545 days.

(21) Appl. No.: 13/595,459

(22) Filed: Aug. 27, 2012

(65) Prior Publication Data

US 2013/0056913 A1    Mar. 7, 2013

(30) Foreign Application Priority Data

Sep. 1, 2011   (DE) ........................ 10-2011-053-180

(51) Int. Cl.
| | | |
|---|---|---|
| *B29C 49/42* | (2006.01) | |
| *B29C 49/06* | (2006.01) | |
| *B29C 49/36* | (2006.01) | |
| *B29C 49/64* | (2006.01) | |
| *B29C 49/78* | (2006.01) | |
| *B29C 49/02* | (2006.01) | |

(52) U.S. Cl.
CPC ............. *B29C 49/4205* (2013.01); *B29C 49/06* (2013.01); *B29C 49/36* (2013.01); *B29C 49/6409* (2013.01); *B29C 49/78* (2013.01); *B29C 2049/023* (2013.01); *B29C 2049/4231* (2013.01)

(58) Field of Classification Search
CPC ........... B29C 2949/78151; B29C 2949/78663; B29C 2049/023; B29C 49/4205; B29C 2049/4231
See application file for complete search history.

(56) References Cited

U.S. PATENT DOCUMENTS

| | | | |
|---|---|---|---|
| 4,313,720 A | | 2/1982 | Spurr |
| 4,418,482 A | * | 12/1983 | Aidlin et al. .................... 34/435 |
| 5,772,951 A | | 6/1998 | Coxhead et al. |
| 8,235,698 B2 | | 8/2012 | Schonberger et al. |
| 8,556,620 B2 | | 10/2013 | Parrinello et al. |

(Continued)

FOREIGN PATENT DOCUMENTS

| | | |
|---|---|---|
| CH | 631654 | 8/1982 |
| DE | 69712130 | 11/2002 |

(Continued)

OTHER PUBLICATIONS

German Search Report issued on Mar. 30, 2012 in corresponding German Patent Application 102011053180.7.

(Continued)

*Primary Examiner* — Robert B Davis
(74) *Attorney, Agent, or Firm* — Onello & Mello LLP

(57) ABSTRACT

Provided are a system and method for producing plastics material containers at a plant. A first processing unit outputs preforms having a temperature above an ambient temperature. A forming arrangement is arranged after the first processing unit in a direction of transport of the preforms, and forms the preforms into the plastics material containers. A heating device heats the preforms. A blow molding machine is in the direction of transport of the plastics material preforms, and expands the heated plastics material preforms to form the plastics material containers by applying a free-flowing medium. A discharge device is between the first processing unit and the forming arrangement, and discharges the plastics material preforms. A storage apparatus stores the plastics material preforms discharged by the discharge device.

15 Claims, 1 Drawing Sheet

(56) References Cited

U.S. PATENT DOCUMENTS

| | | | |
|---|---|---|---|
| 8,985,340 B2 | 3/2015 | Zech | |
| 9,028,739 B2 | 5/2015 | Parrinello et al. | |
| 2002/0011681 A1* | 1/2002 | Rose et al. | 425/526 |
| 2007/0220835 A1* | 9/2007 | Till | 53/471 |
| 2009/0077933 A1* | 3/2009 | Backhaus et al. | 53/561 |
| 2010/0310705 A1 | 12/2010 | Schonberger et al. | |
| 2010/0324723 A1 | 12/2010 | Zech | |
| 2011/0109018 A1 | 5/2011 | Parrinello et al. | |
| 2014/0338291 A1 | 11/2014 | Parrinello et al. | |

FOREIGN PATENT DOCUMENTS

| | | |
|---|---|---|
| DE | 10150780 | 4/2003 |
| DE | 102008008528 | 8/2009 |
| DK | 10150780 | 4/2003 |
| DK | 1020088528 | 8/2009 |
| EP | 0813949 | 12/1997 |
| EP | 0856392 | 8/1998 |
| EP | 2258534 | 12/2010 |
| IT | PR20050048 | 3/2007 |
| JP | H0957825 | 3/1997 |
| WO | 2009101087 | 8/2009 |
| WO | 2009127962 | 10/2009 |

OTHER PUBLICATIONS

Chinese Office Action issued on Jun. 5, 2014 in corresponding Chinese Patent Application 201210322671.0.
Opposition document dated Apr. 29, 2015, issued in corresponding European Patent No. EP2565012B1.

* cited by examiner

SYSTEM AND METHOD FOR PRODUCING PLASTICS MATERIAL CONTAINERS

RELATED APPLICATION

This application claims priority to German Patent Application No. 102011053180.7, filed on Sep. 1, 2011, in the German Patent and Trademark Office, the content of which is incorporated herein by reference in its entirety.

BACKGROUND

Embodiments of the present inventive concepts relate to plant facilities that produce plastics material containers. In a conventional plant facility, it is typical for preforms formed of plastics material to first be heated in a furnace and then to be formed into plastics material containers by a stretch blow molding machine or related apparatus.

Normally, the plastics material preforms, also referred to as preforms, are produced at a different time and in a different location from the containers, for example, by a stretch blow molding process. In the prior art, however, production plant facilities are known, in which the production of the plastics material preforms is connected to a forming process, such as a blow molding process.

The fabricated plastics material preforms are generally moved by conveyor belts, on which the plastics material preforms are transported in an open chute. These conveyor belts may also be encased or ventilated.

Conventional conveyor belts are so long that the plastics material preforms are cooled almost to an ambient temperature in a steady-state operation. If there are interruptions affecting the blow molding machine or the subsequent machines within the line, it can be ensured that the plastics material preforms arrive in the blow molding machine or the upstream furnace again at the same temperature. If the temperature is higher, for example, because the conveyor belts are short and the plastics material preform has more cooling time due to the longer residence time in the event of a line stop and thus has a lower temperature, the blow molding machine can produce plastics material containers of poorer quality until the heating process by the blow molding machine had been readjusted to the input temperature of the other preforms. However, this can result in a higher rejection rate.

When used for grouped productions of this type, a device for producing plastics material preforms, such as an injection molding machine, is generally designed for accommodating a production over-capacity. Excess plastics material preforms are discharged via a guide, directly after the injection molding facility. In the event of line interruptions and line stops that may occur after an injection molding machine or the like, the machine can continue to produce plastics material preforms, which are then moved directly into a container after the injection molding machine. The store of produced plastics material preforms can be moved back into the line during maintenance of the injection molding machine.

SUMMARY

In one aspect, provided is a plant system that produces plastics material containers. The plant system comprises a first processing unit that outputs a plurality of plastics material preforms, each having a temperature above an ambient temperature; and a forming arrangement that is positioned in a direction of transport of the plastics material preforms and that forms the plastics material preforms into plastics material containers. The forming arrangement comprises a heating device that heats the plastics material preforms and a blowing wheel that applies a free-flowing medium to the plastics material preforms.

In an embodiment, the plant system further comprises a transport device that transports the plastics material preforms from the first processing unit to the forming arrangement.

In an embodiment, the transport device has a feed region, at which the plastics material preforms are fed to the transport device.

In an embodiment, the blowing wheel comprises a plurality of application devices, which apply the free-flowing medium to the plastics material preforms; a plurality of blowing stations at which the plastics material preforms are positioned during an application of the free-flowing medium; and a rotatable support, which moves the blowing stations during transportation of the plastics material preforms at the plant system.

In an embodiment, the plant system further comprises a discharge device between the first processing unit and the forming arrangement, the discharge device discharging the plastics material preforms from the first processing unit.

In an embodiment, the plant system further comprises a storage apparatus that at least temporarily stores the plastics material preforms discharged by the discharge device.

In an embodiment, the discharge device is positioned along a transport path of the plastics material preforms from the first processing unit to the forming arrangement, and is positioned closer to the heating device than to the first processing unit.

In an embodiment, the discharge device is positioned directly before the heating device in the transport path of the plastics material preforms.

In an embodiment, the first processing unit includes a production unit that produces the plastics material preforms.

In an embodiment, the first processing unit includes an injection molding machine.

In an embodiment, the plant system further comprises a first temperature detection device that detects a temperature of the plastics material preforms.

In an embodiment, the first processing unit and the forming arrangement operate at production rates matched to one another.

In one aspect, provided is a method for producing plastics material containers. The method comprises provisioning a plurality of plastics material preforms at a predefined temperature; transporting, by a transport device, the plastics material preforms to a forming arrangement; forming, at the forming arrangement, the plastics material preforms into plastics material container. The plastics material preforms are heated in a heating device. A free-flowing medium is applied to expand the plastics material preforms.

In an embodiment, the plastics material preforms are at least temporarily discharged during normal operation after reaching the transport device and before reaching the forming arrangement.

In an embodiment, the plastics material preforms are fed to a storage apparatus for storage.

In an embodiment, the predefined temperature is above an ambient temperature.

In an embodiment, a greater number of plastics material preforms are output from the first processing unit than a number of plastics material preforms formed into plastics material containers by the forming arrangement.

In an embodiment, each plastics material preform is stored in the storage apparatus for a predefined period.

In an embodiment, the predefined periods during which the plastics material preforms are located in the storage apparatus are different for each plastics material preform.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF EMBODIMENTS

Figure 1:
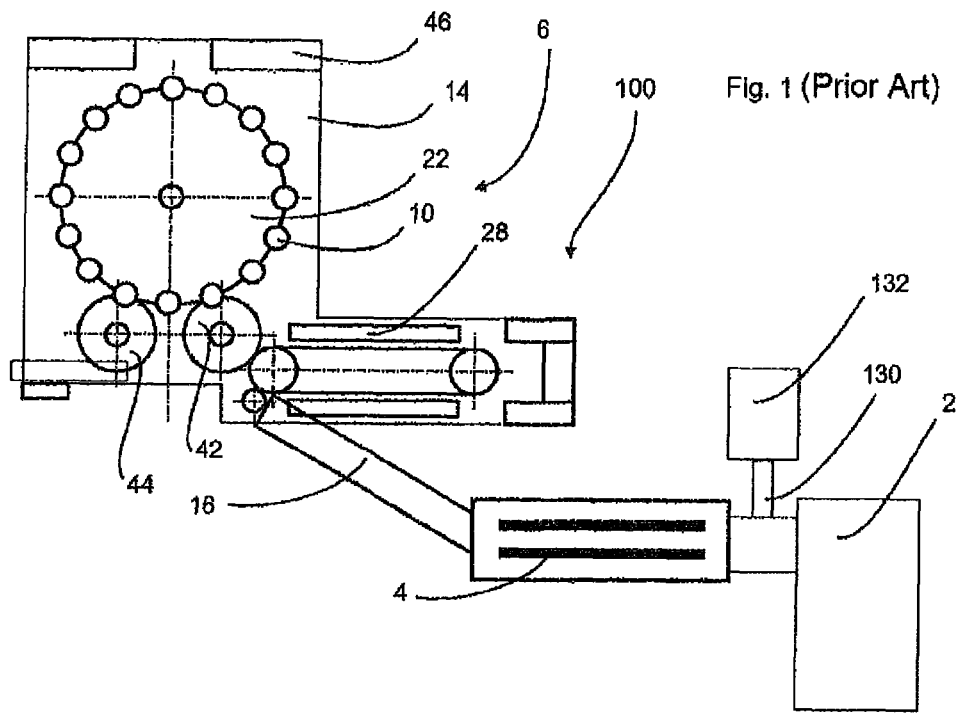
FIG. 1 is an illustration of a plant facility that produces plastics material containers according to the prior art.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions may be exaggerated for clarity. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An object of the present inventive concepts is to provide a processing plant, which avoids the above-mentioned irregularities, for example, in the event of failure of an individual machine.

In an embodiment, a plant for producing plastics material containers comprises a first processing unit, which outputs plastics material preforms having a temperature above an ambient temperature. The plant further comprises a transport vehicle, which transports the plastics material preforms away from the first processing unit, as well as a forming arrangement, which is arranged after the first processing unit in the direction of transport of the plastics material preforms and forms the plastics material preforms into the plastics material containers. The transport vehicle has a feed region, in which the plastics material preforms are fed to the transport device. This forming arrangement has a heating device, which heats the plastics material preforms, as well as a blow molding machine, which is arranged in the direction of transport of the plastics material preforms and expands the heated plastics material preforms so as to form the plastics material containers by applying a free-flowing medium.

A blow molding machine in accordance with embodiments can have multiple applications, which apply a free-flowing medium, in particular, a gaseous medium, to the plastics material preforms. Applications can also relate to a transport device, which transports the plastics material preforms, in particular, during expansion of the preforms. Furthermore, the plant can have a discharge device, which is arranged between the first processing unit and the forming unit, for discharging the plastics material preforms.

In accordance with embodiments of the present inventive concepts, the plant has a storage apparatus for at least temporarily storing the plastics material preforms discharged by the discharge device. The discharge device can be arranged after the feed region of the transport device in the direction of transport of the plastics material preforms, preferably in such a way that the plastics material preforms are only discharged after an entry into the transport device.

The storage apparatus is understood to be adapted to receive a multiplicity of plastics material preforms. The storage apparatus is preferably adapted to receive at least 10, and in some embodiments, preferably at least 50 plastics material preforms. In other embodiments, the storage apparatus is adapted to receive preferably at least 100 plastics material preforms. In other embodiments, the storage apparatus is adapted to receive preferably at least 200 plastics material preforms. In other embodiments, the storage apparatus is adapted to receive more preferably at least 500 plastics material preforms. An application device can advantageously include a blast nozzle, which can be placed over an opening in the plastics material preforms so as to apply the free-flowing medium, in particular air, thereto. The application device is advantageously movable in relation to the plastics material preforms in a longitudinal direction of the plastics material preforms.

A system for a plant can be provided in which plastics material preforms which have already been pre-heated are first provided, for example, from a production unit, and the plastics material preforms or some thereof are then discharged during operation, at least temporarily, and are transferred to the storage apparatus.

In a preferred embodiment the discharge device is arranged along the transport path of the plastics material preforms so as to be closer to the heating device than to the processing unit. For example, the heating device may be an infrared furnace or a microwave furnace, through which the plastics material preforms are transported, wherein the plastics material preforms are preferably heated during this transport process.

An arrangement closer to the heating device is understood to mean that the time required for the transport of the plastics material preforms from the discharge device to the heating device is shorter during normal operation than the time required for the transport of the plastics material preforms from the first processing unit to the discharge device. In an embodiment, the ratio between the time required for the transport of the plastics material preforms from the discharge device to the heating device and the time required for the transport of the plastics material preforms from the first processing unit to the discharge device is advantageously less than 2:3. In another embodiment, this ratio is preferably less than 1:2. In another embodiment, this ratio is preferably less than 1:3. In another embodiment, this ratio is preferably less than 1:4. In another embodiment, this ratio is preferably less than 1:5. In another embodiment, this ratio is more preferably less than 1:7. In another embodiment, this ratio is more preferably less than 1:10.

In another advantageous embodiment, the discharge device is arranged directly before the heating device in the direction of transport of the plastics material preforms. It is therefore proposed for the discharge, in particular, of the overcapacity of a first processing unit, to occur directly at the blow molding machine, preferably both during a steady-state operation and in the event of interruptions and stops in the subsequent production line. This discharge preferably occurs as directly as possible before the heating device so as to keep the number of plastics material preforms between the heating device and the discharge location to a minimum.

In a preferred embodiment, the transport device, on which the plastics material preforms are transported before the first processing unit to the forming arrangement, is designed in such a way that the number of ejected or discharged plastics material preforms is less than an overcapacity of the first processing unit. The transport device can advantageously include a preform conveyor or a roller sorter. Plastics material preforms ejected from the transport device or, more specifically, from the roller sorter are advantageously not re-introduced into conventional lines before the roller sorter, but are instead taken to the storage apparatus, which may be a storage container for example. This provides the advantage that all plastics material preforms have the same temperature history.

In another embodiment, the first processing unit includes a production unit for producing plastics material preforms. It is advantageously an injection molding machine that produces the plastics material preforms. However, the first processing unit can also include a preheating furnace or what is known as a "hotbox", through which the plastics material preforms can be transported so as to thus be brought to a uniform temperature, in particular above the ambient temperature. This arrangement is advantageous in particular for example if the plastics material preforms are collected from outside a warehouse in cold weather conditions, for example, during the winter.

In accordance with an embodiment, the plastics material preforms are transported permanently from the first processing unit or injection molding machine to the forming arrangement, and the residence time to transfer the plastics material preforms between the first processing unit and the forming arrangement is thus also always preferably substantially of equal length. The plastics material preforms always have the same temperature directly at the forming arrangement, irrespective of the length of said conveying distance between the first processing unit and the forming arrangement.

It is therefore possible to shorten the conveying distance as desired, without the forming arrangement encountering problems with regard to the temperature control of the heating device. It is also possible to save space while also achieving lower rejection rates.

The aforementioned shorter conveying distance affords the advantage that an inlet temperature of the plastics material preforms when they are fed to the blow molding machine is higher. That is to say less energy is required for heating.

In another embodiment, the plant has a first temperature detection device for detecting a temperature of the plastics material preforms. A control device is advantageously also provided and controls the above-mentioned heating device according to an output signal of this temperature detection device. The temperature detection device is designed such that it detects the temperature of the plastics material preforms remotely. For example, the blow molding machine may have a sensor for the preform temperature, in particular, at an inlet of the blow molding machine.

In addition, the apparatus may also have a sensor for detecting an ambient temperature. The forming arrangement is thus able to react to different inlet temperatures of the preforms. For example, different programs can be selected independently, such as an inline operation and/or an offline operation. It is also possible for plastics material preforms which do not correspond to a specific temperature specification of devices used in a forming process to be charged. For example, those preforms which are cooler than the usual incoming plastics material preforms can be discharged. For example, this would be the case in the event of interruptions affecting the connecting path between plastics material production and the blow molding machine, or in the event of individual plastics material preforms that have a lower temperature due to the fact that they have remained in the feed.

In another embodiment, the first processing unit and the forming arrangement operate at production rates matched to one another. It would thus be possible for both devices to be grouped together. The inventive concepts can therefore be applied in particular in plant facilities in which the production of the plastics material preforms is connected to or grouped with the production of the containers, in particular, the forming of the plastics material preforms into plastics material containers. However, this is also understood to mean for example that the first processing unit can operate permanently at a higher output rate than the forming arrangement.

Embodiments of the present inventive concepts are also directed to a method for producing plastics material containers. In a first method step, plastics material preforms are provided at a predefined temperature. This temperature is preferably above an ambient temperature. In one method step, the plastics material preforms are transported to a forming arrangement by a transport device, and in a further step the plastics material preforms are formed into plastics material containers by means of the forming arrangement. To this end, the plastics material preforms are first heated in a heating device and the plastics material preforms thus heated are then expanded to form the plastics material containers by the application of a free-flowing medium.

In accordance with another embodiment of the inventive concepts, the plastics material preforms are at least temporarily discharged during normal operation after reaching the transport device and before reaching the forming arrangement and are preferably fed to a storage apparatus so as to be stored. It is therefore also proposed with regard to the method to discharge the plastics material preforms at least temporarily during normal operation so as to achieve a uniform temperature control of the plastics material preforms.

In a preferred embodiment, the first processing unit outputs more plastics material preforms compared to the number of plastics material preforms formed into plastics material containers by the forming arrangement, at least temporarily. The facility for producing the plastics material preforms is thus operated at a specific overproduction compared to the forming arrangement, at least temporarily, so as to thus fill the store into which the plastics material preforms are discharged. The plastics material preforms are advantageously fed to the forming arrangement from the storage apparatus.

In another embodiment, the plastics material preforms are stored in the storage apparatus for predefined periods and are also advantageously transported at predefined times. The storage apparatus therefore advantageously also allows a transport of the plastics material preforms. The storage apparatus advantageously allows separated transport of the plastics material preforms. All plastics material preforms are preferably fed to the heating device from the storage apparatus. In other words, all plastics material preforms preferably also pass through the storage apparatus.

In a preferred embodiment, the periods during which the individual plastics material preforms are located in the storage apparatus differ.

The foregoing method in accordance with an embodiment of present inventive concepts is thus suitable in facilities in which the plastics material preforms are fed at a temperature above the ambient temperature, for example, in the event that the plastics material preforms are produced or come from a conditioning device. In an embodiment, the temperature of the plastics material preforms is preferably at least 5° above the ambient temperature. In another embodiment, the temperature of the plastics material preforms is preferably at least 10° above the ambient temperature. In another embodiment, the temperature of the plastics material preforms is preferably at least 15° above the ambient temperature. In another embodiment, the temperature of the plastics material preforms is preferably at least 20° above the ambient temperature.

FIG. 1 is an illustration of a plant facility 100 that produces plastics material containers according to the prior art. The plant facility 100 has a first processing unit 2, which may be an injection molding machine for producing plastics material preforms. A discharge unit 130 carries preforms output from the injection molding machine 2 to a store 132. The store 132 is positioned directly beside the injection molding machine 2. The disadvantage with such conventional arrangements, as previously described, is that the plant facility 100 is not possible to react in a versatile manner to interruptions, even if only temporary, which affects the first processing unit 2 and/or a second processing unit 6, also referred to as a forming arrangement.

Figure 2:
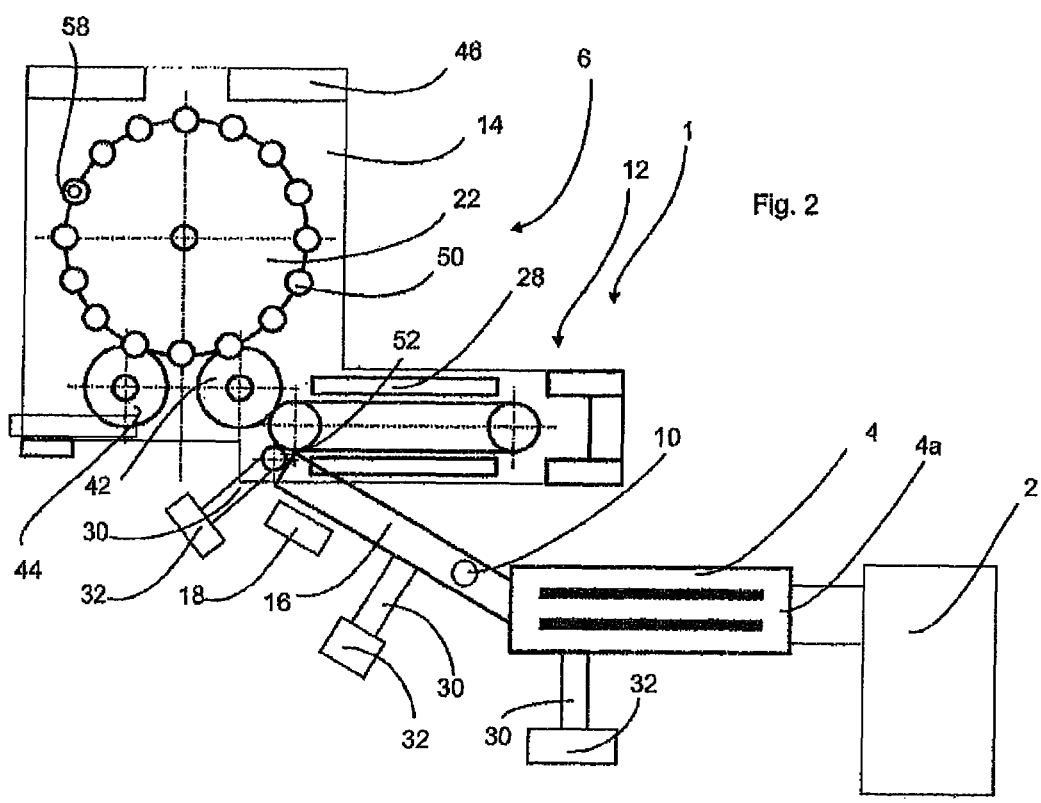
FIG. 2 is an illustration of a plant facility that produces plastics material containers, in accordance with an embodiment of the present inventive concepts.

FIG. 2 is an illustration of a plant facility 200 that produces plastics material containers, in accordance with an embodiment of the present inventive concepts.

As shown in FIG. 2, a first processing unit 2 is provided, which outputs plastics material preforms. A first transport device 4 is provided for transporting the plastics material preforms. The first transport device 4 is connected directly to the first processing unit 2. In an embodiment the first transport device 4 includes a roller sorter, which sorts the output plastics material preforms by means of two parallel rotating rollers. A second transport device 16, which likewise transports the plastics material preforms 10, is connected to the aforesaid transport device 4. More specifically, the second transport device 16 is in this case a rail, along which the plastics material preforms 10 slide. A single-cycle wheel 52 separates the plastics material preforms 10 and feeds them in separated form to the heating device 12. The plastics material preforms are transported through the heating device 12, which may be an infrared furnace, a microwave furnace, or a laser furnace, for example, where they are heated by heating elements 28. The plastics material preforms 10 are fed to the first transport device 4 via a feed region 4a. The plastics material preforms 10 are advantageously guided in an unseparated manner in the first transport device 4. The second transport device 16 advantageously also transports the plastics material preforms in an unseparated manner, but advantageously in a manner in which the plastics material preforms abut one another at least temporarily.

The plastics material preforms are then fed via a feed star 42 to a blowing wheel of a blowing machine 14. The blowing machine 14 and the heating device 12 collectively form a forming arrangement 6, for forming plastics material preforms 10 into plastics material containers. The blowing wheel 14 has a plurality of blowing stations 50, which are arranged on a rotatable support 22. The plastics material preforms 10 can be positioned at the blowing stations 50 during an application of the free-flowing medium, for example, air. A control device 46 can control the actions of the blowing machine 14.

The formed plastics material containers can be removed from the blowing machine 14 by a delivery wheel 44.

Each individual blowing station 50 can include a movable blowing nozzle or related application device 58, which applies air to the plastics material preforms 10 so as to expand them. In an embodiment, the blow molding machine 14 is a stretch blow molding machine, which has a plurality of stretching rods which stretch the plastics material containers 10 in the longitudinal direction thereof during their expansion.

A discharge device 30 discharges the plastics material preforms from the feed. A storage apparatus 32 stores the plastics material preforms at least temporarily. A transport device can be provided within the storage apparatus 32. The plastics material preforms 10 can be transported by the transport device. The discharge device 30 and/or the storage apparatus 32 can have heating device so as to heat the plastics material preforms 10 to a specific temperature, which in particular however is below the temperature at which the plastics material preforms 10 are heated in the heating device 12.

FIG. 2 shows three possible positions for the arrangement of the discharge device 30 and the storage apparatus 32. A discharge preferably takes place directly before the heating device, for example, in the region of the single-cycle wheel 52. It is also possible, however, to carry out the discharge operation in the region of the second transport device 16, or in a region, in particular an end region, of the first transport device 4. The plastics material preforms are only discharged, however, after the feed region 4a. The discharge device 30 can be designed in such a way that it allows the discharge of individual plastics material preforms or of groups of successive plastics material preforms. The discharge operation may also be designed however so that all plastics material preforms are initially discharged and are then transported back to the heating device 12 from the storage apparatus 32.

The discharge device 30 and the storage apparatus 32 are advantageously constructed in such a way that all preforms are transported through the storage apparatus. It is therefore possible, with normal operation, for the first processing unit 2 and the forming arrangement 6 to be grouped together, although the first processing unit 2 can operate at a higher output rate than the forming arrangement. This overproduction occurring during normal operation can be collected by the discharge device 30 and the storage apparatus 32. The storage apparatus is therefore preferably able to receive a variable number of plastics material preforms. In the case of a fault in the first processing unit, this excess in the storage apparatus can be depleted and the plastics material preforms can be fed to the forming arrangement 6 at a precisely defined output temperature.

The temperature detection device 18 detects the temperature of the plastics material preforms. An output signal of this temperature detection device 18 can be output to the control device 46 of the forming arrangement or to a corresponding control device of the heating device 12 so that this adapts the heating of the plastics material preforms 10 accordingly.

Embodiments of the present inventive concepts are directed in particular to plant facilities of types described herein. In other embodiments, the inventive concepts can apply to other plant facilities, that is, in plant facilities in which the preforms are not produced by the same plant.

The applicant reserves the right to claim all features disclosed in the application documents as essential to the invention insofar as they are novel over the prior art, either individually or in combination.

The invention claimed is:

1. A plant system that produces plastics material containers, said plant system comprising:
   a first processing unit that outputs a plurality of plastics material preforms, each having a temperature above an ambient temperature; and
   a forming arrangement that is positioned in a direction of transport of the plastics material preforms and that forms the plastics material preforms into plastics material containers, the forming arrangement comprising:
   a first heating device that heats the plastics material preforms;
   a blowing wheel that applies a free-flowing medium to the plastics material preforms;
   a transport device including a roller sorter; and
   a discharge device between the first processing unit and the forming arrangement, the discharge device discharging the plastics material preforms from the first processing unit, wherein the discharge unit is arranged downstream in a transport direction of the roller sorter, the plant system further comprising:
   a storage apparatus that at least temporarily stores the plastics material preforms discharged by the discharge device, wherein the storage apparatus receives a variable number of plastics material preforms, wherein in a normal operation, the storage apparatus is constructed and arranged to receive a first number of overproduced preforms in response to the first processing unit operating to produce preforms at a higher rate than a rate at which the forming arrangement is capable of receiving the produced preforms, and wherein in the event of a fault by the first processing unit, a second number of overproduced preforms in the storage device are output to the forming arrangement.

2. The plant system of claim 1, wherein the transport device transports the plastics material preforms from the first processing unit to the forming arrangement.

3. The plant system of claim 2, wherein the transport device has a feed region, at which the plastics material preforms are fed to the transport device.

4. The plant system of claim 1, wherein the blowing wheel comprises:
   a plurality of application devices, which apply the free-flowing medium to the plastics material preforms;
   a plurality of blowing stations at which the plastics material preforms are positioned during an application of the free-flowing medium; and
   a rotatable support, which moves the blowing stations during transportation of the plastics material preforms at the plant system.

5. The plant system of claim 1, wherein the discharge device is positioned along a transport path of the plastics material preforms from the first processing unit to the forming arrangement, and is positioned closer to the heating device than to the first processing unit.

6. The plant system of claim 5, wherein the discharge device is positioned directly before the heating device in the transport path of the plastics material preforms.

7. The plant system of claim 1, wherein the first processing unit includes a production unit that produces the plastics material preforms.

8. The plant system of claim 1, wherein the first processing unit includes an injection molding machine.

9. The plant system of claim 1, further comprising a first temperature detection device that detects a temperature of the plastics material preforms.

10. The plant system of claim 1, wherein the first processing unit and the forming arrangement operate at production rates matched to one another.

11. The plant system of claim 1, wherein the storage apparatus includes a transport device.

12. The plant system of claim 1, at least one of the discharge device or the storage apparatus has a second heating device for heating the plastics material preforms to a predetermined temperature, is below a temperature at which the plastics material preforms are heated in the first heating device.

13. The plant system of claim 1, wherein the discharge device and the storage apparatus are constructed and arranged such that the preforms are transported through the storage apparatus, and wherein overproduction occurring during normal operation is collected by the discharge device and the storage apparatus.

14. The plant system of claim 1, wherein the plastics material preforms run through the roller sorter.

15. The plant system of claim 1, wherein ejected preforms are taken to the storage apparatus.

* * * * *